United States Patent
Buduguppa et al.

(10) Patent No.: US 12,333,254 B2
(45) Date of Patent: Jun. 17, 2025

(54) SYSTEMS AND METHODS RELATING TO KNOWLEDGE DISTILLATION IN NATURAL LANGUAGE PROCESSING MODELS

(71) Applicant: GENESYS CLOUD SERVICES, INC., Daly City, CA (US)

(72) Inventors: Pavan Buduguppa, Hyderabad (IN); Ramasubramanian Sundaram, Hyderabad (IN); Veera Raghavendra Elluru, Hyderabad (IN)

(73) Assignee: Genesys Cloud Services, Inc., Menlo Park, CA (US)

( * ) Notice: Subject to any disclaimer, the term of this patent is extended or adjusted under 35 U.S.C. 154(b) by 690 days.

(21) Appl. No.: 17/557,245

(22) Filed: Dec. 21, 2021

(65) Prior Publication Data

US 2023/0196024 A1 Jun. 22, 2023

(51) Int. Cl.
*G06N 3/082* (2023.01)
*G06F 40/30* (2020.01)
*G06N 3/045* (2023.01)
*G06N 5/02* (2023.01)

(52) U.S. Cl.
CPC ............ *G06F 40/30* (2020.01); *G06N 3/045* (2023.01); *G06N 5/02* (2013.01); *G06N 3/082* (2013.01)

(58) Field of Classification Search
CPC .................................................... G06N 3/082
See application file for complete search history.

(56) References Cited

U.S. PATENT DOCUMENTS

| | | | |
|---|---|---|---|
| 11,182,691 B1* | 11/2021 | Zhang | G06N 20/20 |
| 2021/0150340 A1 | 5/2021 | Liu et al. | |
| 2022/0036194 A1* | 2/2022 | Sundaresan | G06N 3/063 |
| 2022/0036890 A1* | 2/2022 | Yuan | G10L 15/063 |
| 2022/0122615 A1* | 4/2022 | Chen | G10L 21/028 |

OTHER PUBLICATIONS

International Search Report and Written Opinion of co-pending PCT application having application No. PCT/US2022/053598 mailed on Mar. 23, 2023.
Jiao Xiaoqi et al., "Improving tast-agnostic BERT distillation with layer mapping search", Neurocomputing, Elsevier, Amsterdam, NL, vol. 461, Jul. 21, 2021, pp. 194-203, XP086796944, ISSN: 0925-2312, DOI: 10.1016/J.NEOCOM.2021.07.050.

* cited by examiner

*Primary Examiner* — Feng-Tzer Tzeng
(74) *Attorney, Agent, or Firm* — Taft Stettinius & Hollister LLP

(57) ABSTRACT

A method for creating a student model from a teacher model for knowledge distillation. The method may include: providing the teacher model trained on a first training dataset; generating candidate student models, wherein each of the candidate student models is a model having a unique permutation of layers derived by randomly selecting one or more layers of the plurality of layers of the teacher model for removing; generating a second training dataset; for each of the candidate student models: providing the second training dataset as inputs; recording outputs generated; and based on the recorded outputs, evaluating a performance according to a predetermined model evaluation criterion; determining which of the candidate student models performed best among the candidate student models based on the predetermined model evaluation criterion; identifying a preferred candidate student model.

18 Claims, 6 Drawing Sheets

SYSTEMS AND METHODS RELATING TO KNOWLEDGE DISTILLATION IN NATURAL LANGUAGE PROCESSING MODELS

BACKGROUND

The present invention generally relates generally to machine learning models and neural networks, and more specifically, to knowledge distillation for pre-trained language models. More particularly, but not by way of limitation, the present invention relates to telecommunications systems in the field of customer relations management, including how knowledge distillation of pre-trained language models in this field is performed efficiently distilled and such language models applied, particularly in a contact center setting.

BRIEF DESCRIPTION OF THE INVENTION

The present invention includes a method for creating a student model from a teacher model for use in knowledge distillation. The method may include the steps of: providing the teacher model, where the teacher model is a neural network having a plurality of layers; and the teacher model is trained on a first training dataset; generating candidate student models, wherein each of the candidate student models is a model having a unique permutation of layers derived by randomly selecting one or more layers of the plurality of layers of the teacher model for removing; generating a second training dataset that is data randomly selected data from the first training dataset; for each of the candidate student models: providing the second training dataset as inputs to the candidate student model; recording outputs generated by the candidate student model from the second training data set; and based on the recorded outputs, evaluating a performance of the candidate student model according to a predetermined model evaluation criterion; determining which of the candidate student models performed best among the candidate student models based on the predetermined model evaluation criterion; identifying a preferred candidate student model as being the candidate student model that performed best.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components. The drawings include the following figures.

DETAILED DESCRIPTION

Figure 1:
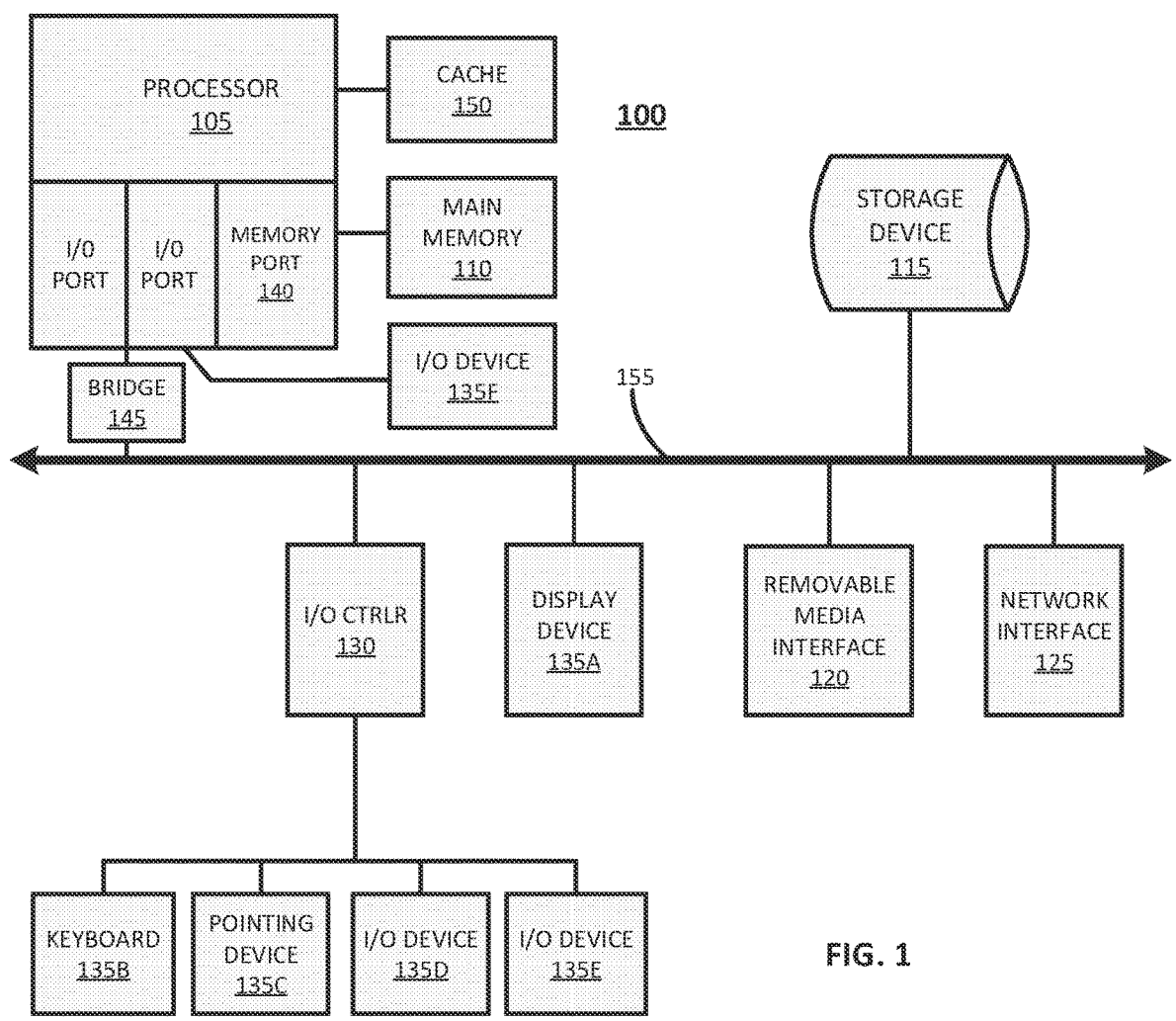
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Those skilled in the art will recognize from the present disclosure that the various embodiments may be computer implemented using many different types of data processing equipment, with embodiments being implemented as an apparatus, method, or computer program product.

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Computing Device

The systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to any of the computing systems described herein, the various servers and computer devices may be located on computing devices 100 that are local (i.e., on-site) or remote (i.e., off-site or in a cloud computing environment), or some combination thereof.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The main memory 110 may be one or more memory chips capable of storing data and allowing stored data to be directly accessed by the central processing unit 105. The storage device 115 may provide storage for an operating system. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The computing device 100 may also support one or more removable media interfaces 120. More generally, the I/O devices 135 may include any conventional devices for performing the functionality described herein.

Unless otherwise restricted, the computing device 100 may be any workstation, desktop computer, laptop or notebook computer, server machine, virtualized machine, mobile or smart phone, portable telecommunication device, or any other type of computing device, without limitation, capable of performing the functionality described herein. The computing device 100 may include a plurality of devices and resources connected by a network. As used herein, a network includes one or more computing devices, machines, clients, client nodes, client machines, client computers, endpoints, or endpoint nodes in communication with one or more other such devices. The network may be a private or public switched telephone network (PSTN), wireless carrier network, local area network (LAN), private wide area network (WAN), public WAN such as the Internet, etc., with connections being established using communication protocols. More generally, it should be understood that, unless otherwise limited, the computing device 100 may communicate with other computing devices 100 via any type of network using any communication protocol. Further, the network may be a virtual network environment where various network components are virtualized. Other types of virtualization are also contemplated.

Contact Center

Figure 2:
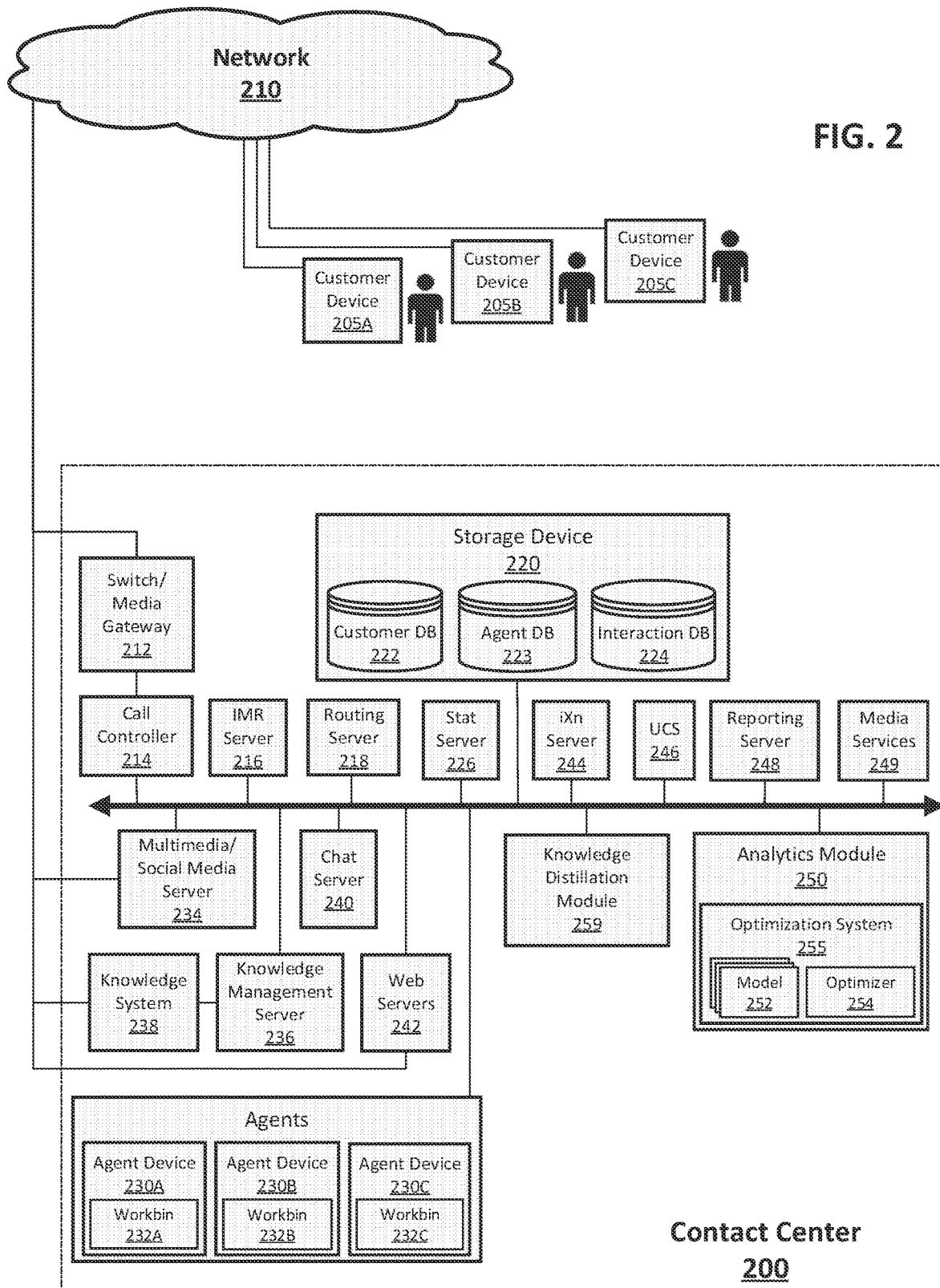
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may receive customer orders, solve customer problems with products or services already received, or assist customers in making purchasing decisions. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Referring specifically to FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction server 244; universal contact server (or "UCS") 246; reporting server 248; media services server 249; an analytics module 250; and a customer queue manager module (or, simply, customer queue manager) 259. Any of the computer-implemented components, modules, or servers described in relation to FIG. 2 or in any of the following figures may be implemented via any type of computing devices, including the exemplary computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, and the like.

Inbound and outbound communications from and to the customer devices 205 may traverse the network 210, with the nature of network typically depending on the type of customer device being used and form of communication. As an example, the network 210 may include a communication network of telephone, cellular, and/or data services.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. The call controller 214 may be configured to process PSTN calls, VoIP calls, etc.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels.

In regard to the router or routing server 218, it may function to route incoming interactions. The routing server 218 may perform predictive routing whereby incoming interactions are routed to resources calculated to deliver the best result for the customer and/or contact center.

Regarding data storage, the contact center system 200 may include one or more mass storage devices—represented generally by the storage device 220—for storing data relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others, as functionality described herein would require.

The agent devices 230 of the contact center 200 may be communication devices configured to interact with the various components and modules of the contact center system 200 in ways that facilitate functionality described herein. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices 230, any number may be present.

In regard to the multimedia/social media server 234, it may be configured to facilitate media interactions (other than voice) with the customer devices 205 and/or the web servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200.

In regard to the interaction server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction server 244 may be configured to interact with the routing server 218 for selecting an appropriate agent to handle each of the deferrable activities. Once assigned to a particular agent, the deferrable activity is pushed to that agent so that it appears on the agent device 230 of the selected agent. The deferrable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like. According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

In regard to the knowledge distillation module 259, this component provides functionality related to distilling or simplifying a computationally complex model so that it may be deployed more efficiently while still achieving similarly accurate results. Contact centers may use the distillation process in relation to neural network models employed in a range of functions, including, for example, tasks related to natural language processing. As discussed in more detail below, the knowledge distillation module 259 achieve this via orchestrating other components, servers, and modules of a contact center and the data related thereto, such as those components, servers, and modules described above in relation to the example contact center system 200, so to provide the functionality described herein, as would be understood by one of ordinary skill in the art.

Turning now to FIGS. 3-6, the functionality of the knowledge distillation module 259 and other aspects of the present invention will be presented in accordance with example embodiments. Before proceeding with this, though, some background will be provided as to artificial intelligence/machine learning, the neural network and deep learning associated therewith, and knowledge distillation, while also highlighting some shortcomings that the present invention is intended to address, particularly in regard to employing such models within a contact center environment. However, it will be appreciated that, unless otherwise limited, aspects of this invention may be practiced in other applications (i.e., applications not involving a contact center).

Within many fields, artificial intelligence and machine learning implemented with neural networks and deep learning models has demonstrated great promise as a technique for automatically analyzing real-world information with human-like accuracy. In general, such neural network and deep learning models (which may be referred to herein generally simply as "neural networks" or "neural network models") receive input information and make predictions based on the same. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications.

Natural language processing (NLP) is one class of problems to which neural networks have been applied with much success. NLP tasks include natural language inference, sentiment classification, and semantic textual similarity. Pretrained language models learn highly effective general language representations from large scale unlabeled data. And, with the introduction of bidirectional encoder representations from transforms ("BERT" models), new levels of state-of-the-art performance on many NLP tasks have been established. However, although these models have pushed the envelope in terms of accuracy metrics, they are often very large and cumbersome to deploy into a cloud computing environment due to their memory footprint and performance bottlenecks in terms of latency. Such models typically use dozens, if not hundreds, of millions of parameters, invariably leading to resource-intensive inference. One of the most common ways of improving a model's performance in this regard is to reduce its complexity. As will be appreciated, this can be done by a process called knowledge distillation.

The main idea of knowledge distillation is to have a smaller, less complex model (for example, fewer number of hidden layers and/or number of neurons per hidden layer) learn the input to output mapping of the larger model. In this arrangement, the large model, which achieves state-of-the-art performance, is referred to as the parent or teacher model, while the smaller model, which learns to mimic the behavior of the teacher model, is referred to as the child or student model. This is generally achieved by feeding the teacher model with a vast corpus of data and obtaining the output distribution of the model. The same large corpus of data is then fed to the student model and the weights of the student model are learned by way of back propagating the errors the student model makes on the target distribution (i.e., the output of the teacher model). A loss function is used to evaluate how well the student model mimics the output of the teacher model.

The knowledge distillation process can be made more efficient by strategically selecting a model architecture for the student model that is receptive and capable to learning the behavior of the teacher model. In a conventional approach, the starting point of the student model is a smaller, less complex model that has been pretrained on an associated generic task. However, in accordance with the present invention, it has been found to be more efficient to choose a subset of weight parameters from the teacher model for use in the student model, as the teacher model has already been finetuned on the task at hand. Specifically, in regard to BERT models, the main computational unit that learns the complex linguistic patterns from the encoder side of the model, the self-attention with the feed forward block. This is also the unit that is computationally expensive during the runtime. So, one way to make the knowledge distillation process more efficient is to reduce the number of these units to an optimum or reduce the complexity of these units or both. A way to achieve this is to determine specific layers within the teacher model that should be kept and others that should be discarded in configuring the student model. That is, certain layers within the teacher model are selected for remaining and forming a starting point of the student model (i.e., for use as the starting point for further distillation), while other layers are selected for discarding. The layers that are discarded are not included in the student model. In this way, the beginning configuration of the student model is one having a simplified configuration compared to the teacher model (i.e., a reduced number of layers). Further, if the layers identified for keeping and discarding are appropriately selected, the student model may have a beginning configuration that more readily and accurately learns to mimic the output of the teacher model. Of course, the question as to how layers are identified for keeping or discarding is a difficult one. As will now be discussed, the present disclosure proposes the following solutions to this challenging question.

Figure 3:
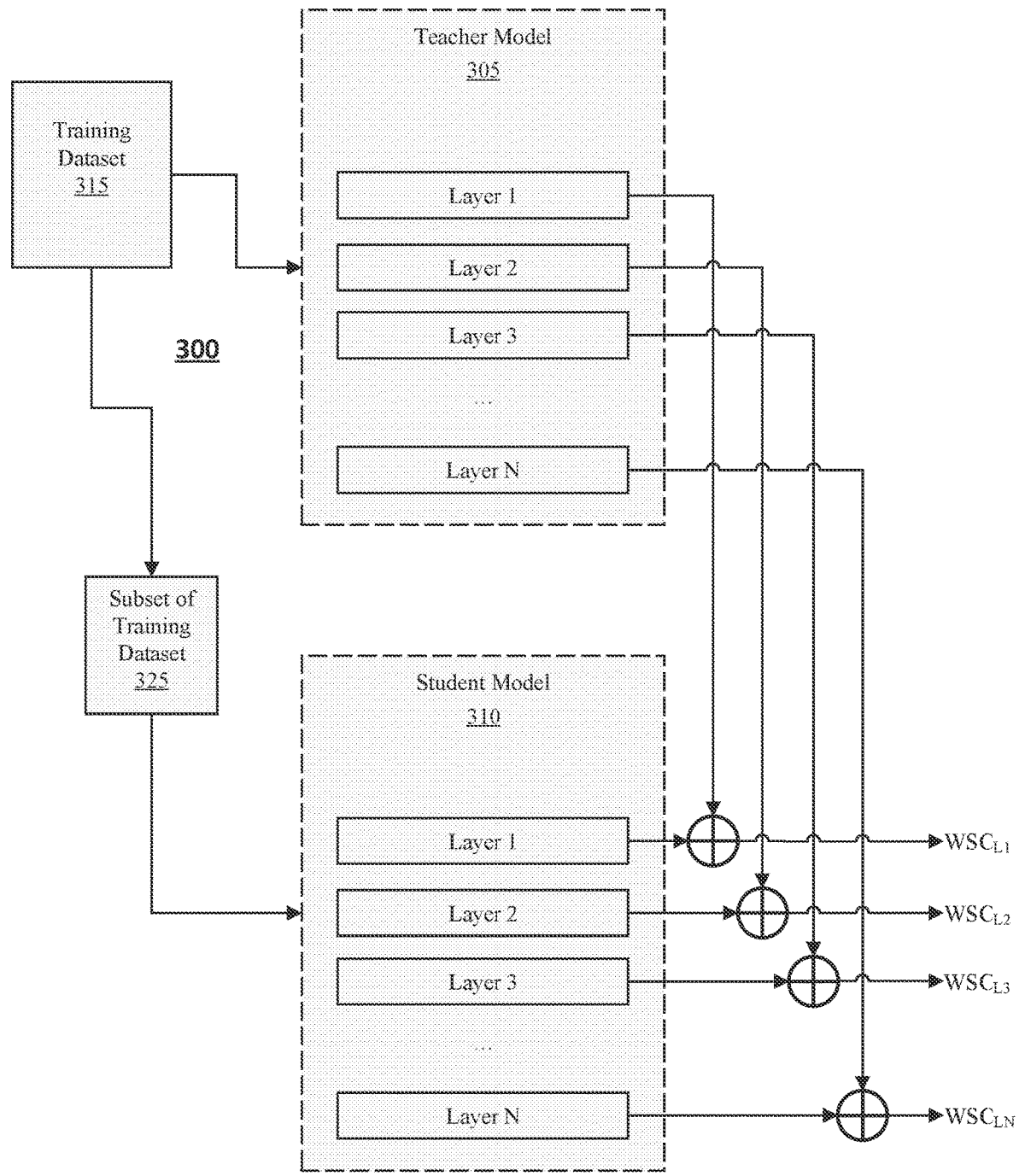
FIG. 3 is a schematic representation of a system in accordance with an example embodiment of the present application.
Figure 4:
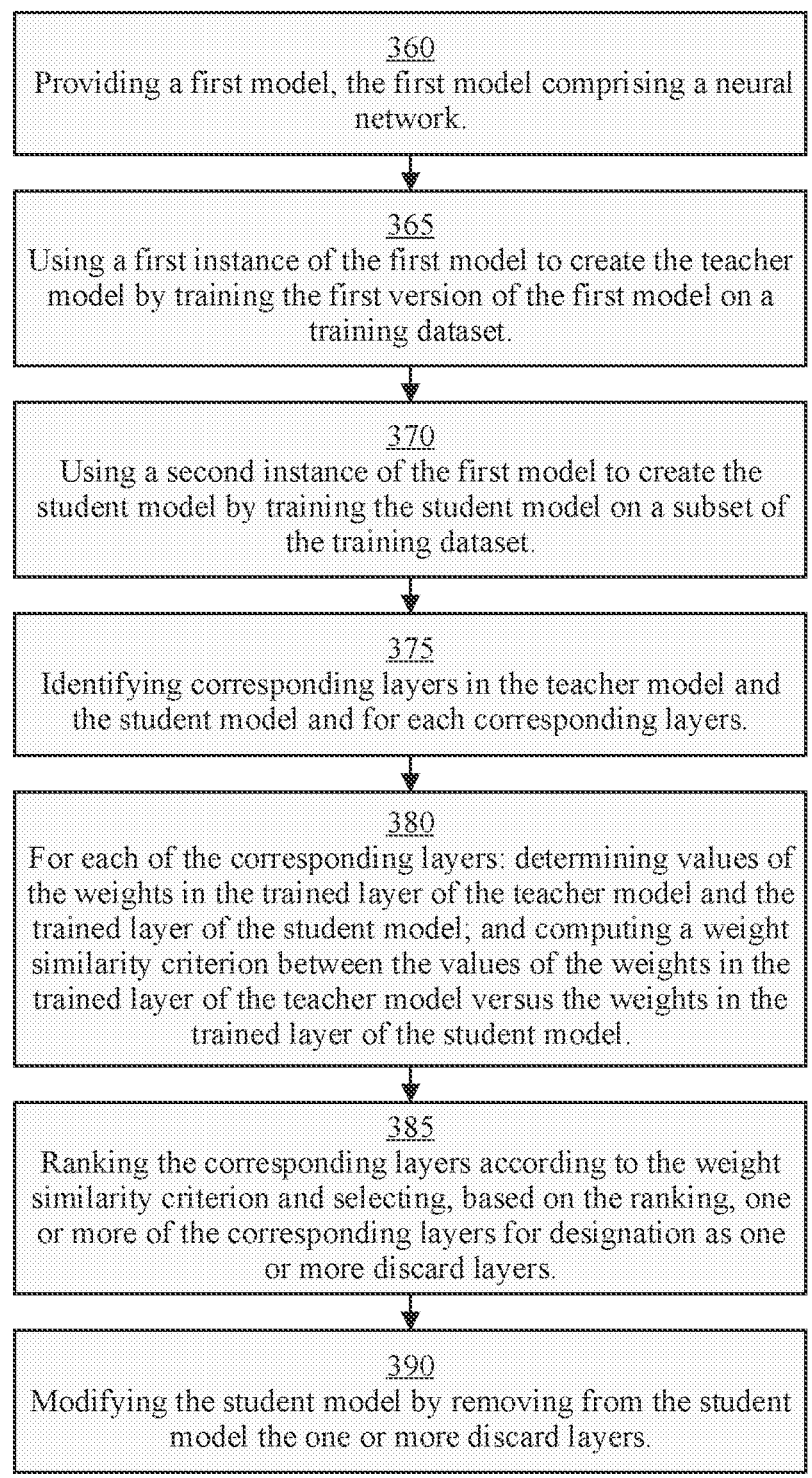
FIG. 4 is an automated process for distilling a model in accordance with an example embodiment of the present application.

In reference now with FIGS. 3 and 4, the present invention proposes a method for differentiating between the layers that should be kept and the layers that should be discarded in forming the student model. With specific reference to FIG. 3, a schematic representation of a system 300 in accordance with an example embodiment of the present application. The system 300, for example, provides a configuration for the knowledge distillation module 259 according to the present invention. As illustrated, the system 300 may include a teacher model 305, a student model 310, a training dataset 315, and a subset of training dataset 325.

In short, at an initial step, the teacher model 305 is trained on the training dataset 315. The student model 310 is based on the same pretrained model as the teacher model 305, but the student model 310 is trained on just a fraction of the training dataset. For example, the student model 310 may be trained on a subset of training dataset 325, with that subset being for example, less than 10% of the training dataset. The subset may be randomly selected. Then the values of the weights in corresponding layers of the teacher model 305 and the student model 310 are compared. For example, the Euclidean distance between the flattened weights between the corresponding layers is computed, with the layers then being selected for keeping or discarding based on the relative value of the Euclidean distance between the corresponding layers. For example, a plurality of corresponding layers having the greatest Euclidean distance are selected as layers to keep in the student model 310, while at least one or more of the corresponding layers having the least Euclidean distance are selected as layers to discard in the student model 310. The student model 310 is then modified in accordance with these layer selections. In making the selections in this way, the corresponding layers in the teacher and student models that show the greatest changed in weight values are kept in the student model 310 because the higher level of change indicates that these layers are more meaningful to the output of the models. In regard to the layers showing the least amount of change in weight values, these layers are discarded because the lower level of change in weight values indicates that these layers are more redundant to the output of the models.

With reference to FIG. 4, an automated method 350 is provided for creating a student model 310 from a teacher model 305 for use in knowledge distillation. At step 360, the method includes providing a first model. The first model may be a neural network having a plurality of layers, i.e., hidden layers. Each of the plurality of layers includes neurons, with each of the neurons having weights equal to a number of synapses leading to the neuron from each of the neurons in a preceding layer.

At step 365, the method may include using a first instance of the first model to create the teacher model 305. This may be done by training a first instance of the first model on a training dataset 315. As stated above, this would include training the teacher model 305 on the whole of the training dataset 315.

At step 370, the method may include using a second instance of the first model to create the student model 310 by training the second instance of the first model on a subset of the training dataset 325. As stated above, the subset may be less than 10% of the training dataset.

At step 375, the method may include identifying corresponding layers in the teacher model 305 and the student model 310. As used herein, corresponding layers are a trained layer in the teacher model 305 and a trained layer in the student model 310 derived from a same level in the first model.

At step 380, the method may include, for each of the corresponding layers: determining values of the weights in the trained layer of the teacher model 305; determining values of the weights in the trained layer of the student model 310; and computing a weight similarity criterion, where the weight similarity criterion calculates a value representing a degree of similarity between the values of the weights in the trained layer of the teacher model 305 versus the values for the weights in the trained layer of the student model 310.

At step 385, the method may include ranking the corresponding layers according to the weight similarity criterion, and selecting, based on the ranking of the corresponding layers according to the weight similarity criterion, one or more of the corresponding layers for designation as one or more discard layers.

At step 390, the method may include modifying the student model 310 by removing from the student model 310 the one or more discard layers. The one or more discard layers may be the one or more corresponding layers ranked as having the highest degree of similarity.

In accordance with certain embodiments, the weight similarity criterion may be a Euclidean distance calculated between the flattened values of the weights in the trained layer of the teacher model 305 versus the flattened values for the weights in the trained layer of the student model 310. Other criteria also may be used for evaluating a similarity between the weights in corresponding layers.

In accordance with certain embodiments, the method may further include the step of training the modified student model 310 (i.e., the student model 310 that has had the discard layers removed from it) so that an output of the modified student model 310 over a transfer dataset mimics an output of the teacher model 305 over the transfer dataset to within an acceptable loss of validity as defined by a predetermined loss function. The transfer dataset may be a set of data that is different than the training dataset 315. The method may further include the step of using or employing the modified student model 310 for a natural language processing task in a contact center. The natural language processing task may include natural language inference, sentiment classification, and semantic textual similarity. In such cases, a preferred embodiment includes the first model being a bidirectional encoder representations from transforms architecture.

Figure 5:
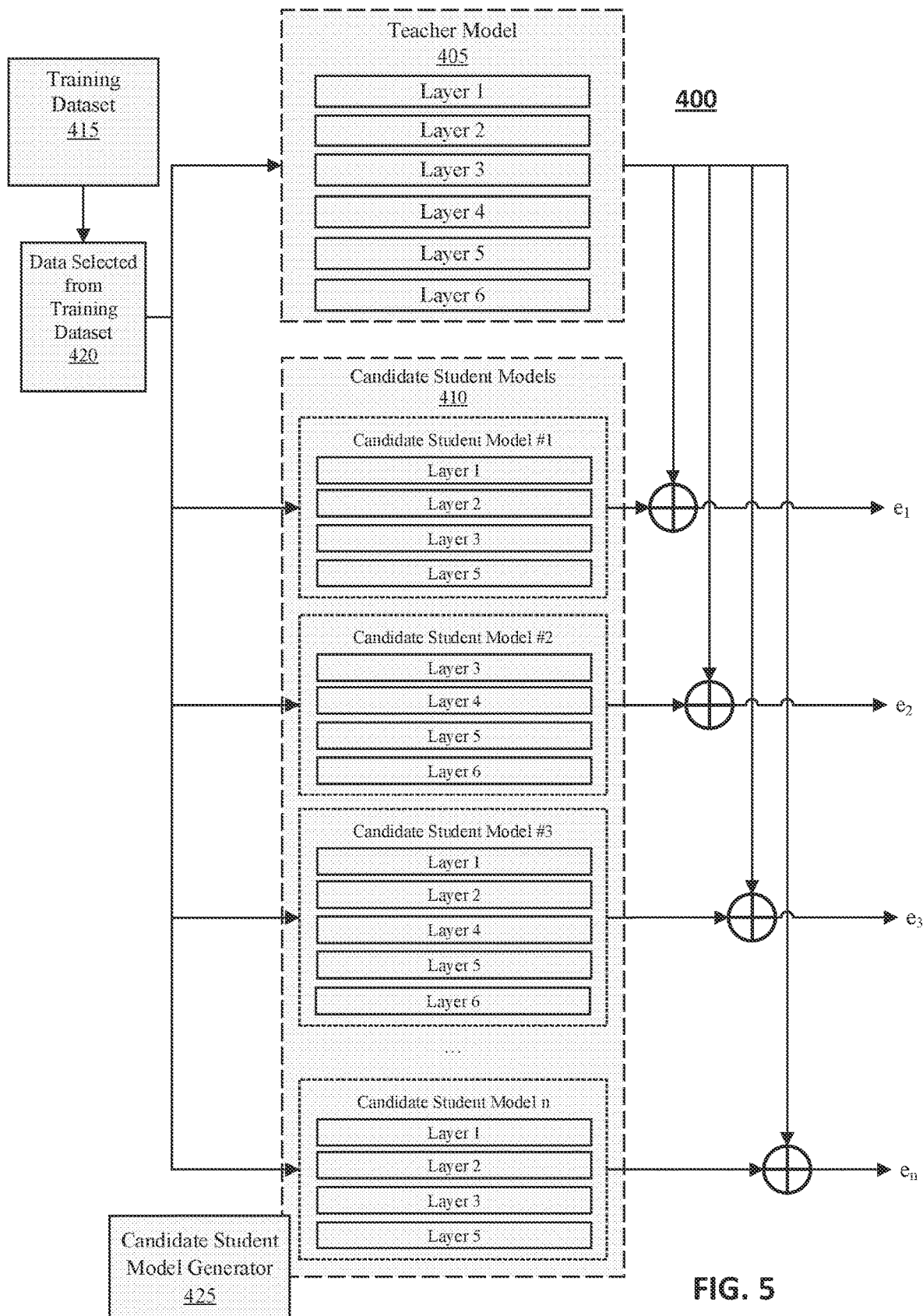
FIG. 5 is a schematic representation of an alternative system in accordance with an example embodiment of the present application.
Figure 6:
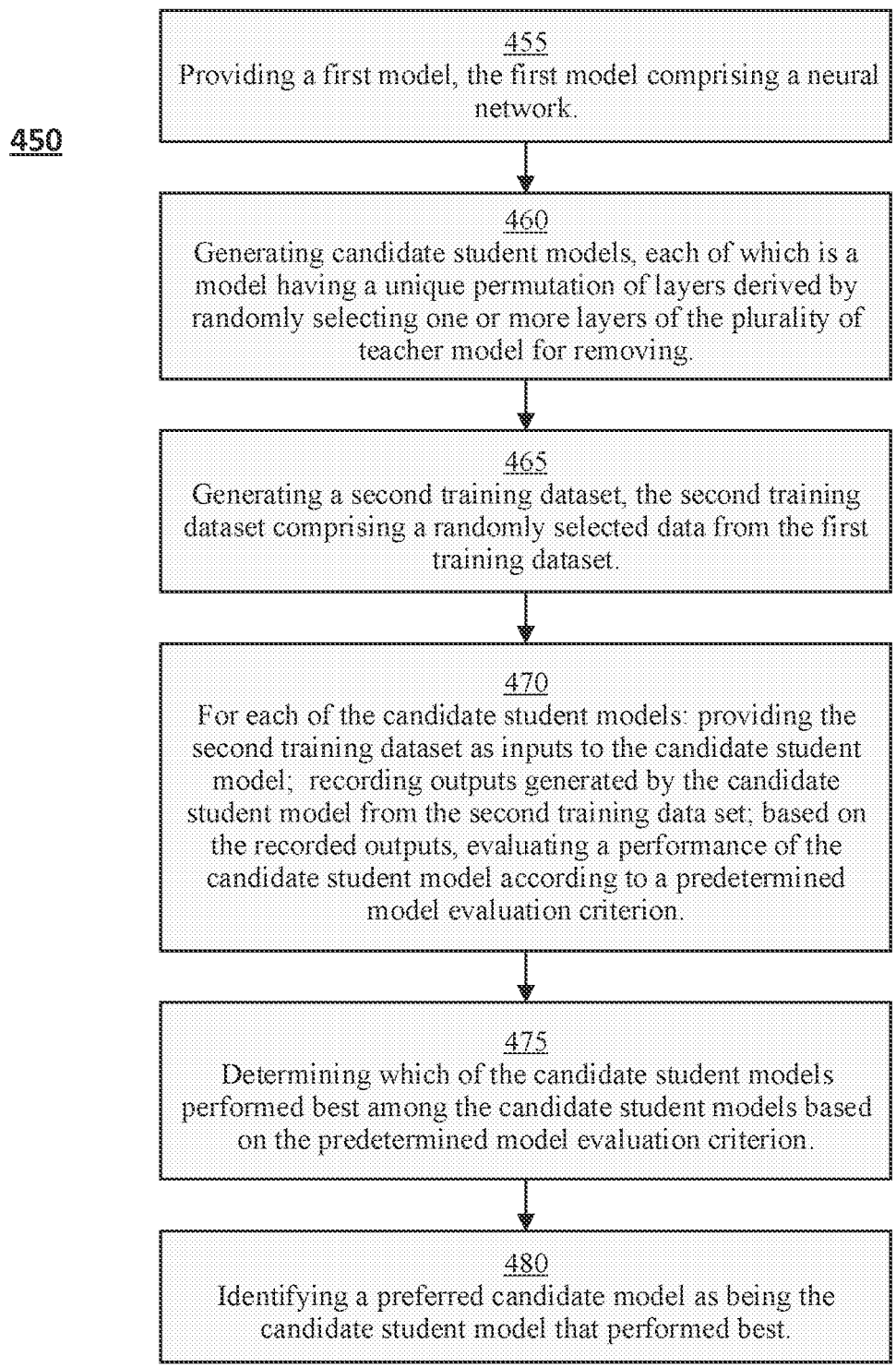
FIG. 6 is an alternative automated process for distilling a model in accordance with an example embodiment of the present application.

With reference now to FIGS. 5 and 6, the present invention proposes an alternative way to differentiate between the layers that are kept and those that are discarded to form the student model. As shown in FIG. 5, a schematic representation of a system 400 is shown in accordance with an example embodiment of the present application. The system 400, for example, provides another possible configuration for the knowledge distillation module 259 according to the present invention. As illustrated, the system 400 may include a teacher model 405, candidate student models 410, a training dataset 415, data selected from the training dataset 420; and a candidate student model generator 425.

In this case, the teacher model 405 is trained on the training dataset 415. Then candidate student models 410 are generated by the candidate student model generator 425 based on the layers in the trained teacher model 405. For example, in the exemplary case shown of a teacher model 405 having 6 layers, the candidate student model generator 425 would generate candidate student models 410 in which one or more of the layers in the teacher model are removed. Thus, as shown, the example candidate student model 410 may include a "Candidate Student Model No. 1" that has layers 1, 2, 3, & 5, a "Candidate Student Model No. 2" that has layers 3, 4, 5, & 6; a "Candidate Student Model No. 3" that has layers 1, 2, 4, 5, & 6, and so on. The candidate student model generator 425 may generate candidate student models until each permutation is satisfied or a desired level based on user defined constraints, such as a minimum number of layers. Then each of the candidate student models 410 is fed as input data selected from training dataset 420 (which, for example, may be selected as a random cross section of the training dataset 415) and accuracy metrics for each test are recorded. For example, as shown, an error (e) may be calculated between the output of the each of the candidate student models 410 and teacher model 405. In accordance with an example embodiment, this testing is repeated for each of the candidate student models 410 until a large number of iterations, for example, 100,000 iterations, are completed for each. In this way, each candidate student model has test data across a range of data taken from the training dataset 415. From the recorded accuracy metrics and performance evaluated therefrom, a preferred candidate student model is then identified. The preferred candidate student model may then be used as the student model that is then further distilled to accurately mimic the output of the teacher model 405.

With reference to FIG. 6, an automated method 450 is provided for creating a student model from a teacher model 405 for use in knowledge distillation. At a step 455, the method may include providing a teacher model 405, where the teacher model 405 is a neural network having a plurality of layers. The teacher model 405 is trained on a first training dataset 415.

At a step 460, the method may include generating candidate student models 410. As described, each of the candidate student models 410 may be a model having a unique permutation of layers derived by randomly selecting one or more layers of the plurality of layers of the teacher model 405 for removing. Specifically, the one or more selected layers are discarded from the teacher model to create one of the candidate student models.

At a step 465, the method may include generating a second training dataset. The second training dataset may be composed of data selected from training dataset 420, such as randomly selected data from the first training dataset.

At a step 470, the method may include, for each of the candidate student models 410: providing the second training dataset as inputs to the candidate student model; recording outputs generated by the candidate student model from the second training data set; and based on the recorded outputs, evaluating a performance of the candidate student model according to a predetermined model evaluation criterion.

At a step 475, the method may include determining which of the candidate student models 410 performed best among the candidate student models 410 based on the predetermined model evaluation criterion. And, at a final step 480, the method may include identifying a preferred candidate model as being the candidate student model that performed best.

In certain embodiments, the method may include further distilling the preferred candidate model. This may include training the preferred candidate student model so that an output of the preferred candidate student model over a transfer dataset mimics an output of the teacher model 405 over the transfer dataset to within an acceptable loss of validity as defined by a predetermined loss function. In certain embodiments, the method further includes using or employing the preferred candidate student model for a natural language processing task in a contact center. The natural language processing task may be natural language inference, sentiment classification, or semantic textual similarity. In such cases, a preferred embodiment includes the teacher model 405 being a bidirectional encoder representations from transforms architecture.

In accordance with certain embodiments, the predetermined model evaluation criterion includes an output accuracy where the output of the candidate student model is compared to an output of the teacher model 405. The candidate student model having the highest average accuracy may be the one that is selected as the preferred candidate student model for further distillation.

In accordance with certain preferred embodiments, the predetermined model evaluation criterion includes a Bayesian Information Criterion (BIC). The BIC score is particularly useful in this context because it provides insight as to both model complexity (for example, number of tunable parameters) and accuracy. In this way, the candidate student model having as low complexity as possible while maintaining high accuracy can be selected as the preferred model. Specifically, because the tradeoff between accuracy and model complexity is captured by BIC, computing this score for all the test iterations and picking the candidate student model having the best score is an effective way to find the preferred candidate student model. The BIC score for each iteration for the candidate model may be computed as follows:

$$BIC=-2.0*\ln(F1\,Score)+K*\ln(n)$$

where "K" is the number of tunable parameters in the candidate model and "n" being the number of test samples based on which the "F1 Score" for the candidate model is computed. So, in this case, the preferred candidate student model selection is selected as the candidate student model having the lowest (i.e., the best) average BIC score, with is the most preferable. This preferred model may then be distilled further, as described above.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A method for creating a student model from a teacher model for use in knowledge distillation, the method comprising:

providing the teacher model, wherein:

the teacher model comprises a neural network having a plurality of layers; and the teacher model is trained on a first training dataset;

generating candidate student models, each of the candidate student models comprising a model having a unique permutation of layers derived by randomly selecting one or more layers of the plurality of layers of the teacher model for removing;

generating a second training dataset, the second training dataset comprising a randomly selected data from the first training dataset;

for each of the candidate student models:
providing the second training dataset as inputs to the candidate student model;
recording outputs generated by the candidate student model from the second training data set; and
based on the recorded outputs, evaluating a performance of the candidate student model according to a predetermined model evaluation criterion;

determining which of the candidate student models performed best among the candidate student models based on the predetermined model evaluation criterion; and identifying a preferred candidate student model as being the candidate student model that performed best.

2. The method of claim 1, wherein the predetermined model evaluation criterion comprises an output accuracy wherein the output of the candidate student model is compared to an output of the teacher model.

3. The method of claim 1, wherein the predetermined model evaluation criterion comprises a Bayesian Information Criterion.

4. The method of claim 1, further comprising the step of:
training the preferred candidate student model so that an output of the preferred candidate student model over a transfer dataset mimics an output of the teacher model over the transfer dataset to within an acceptable loss of validity as defined by a predetermined loss function.

5. The method of claim 4, further comprising the step of:
employing the preferred candidate student model for a natural language processing task in a contact center, the natural language processing task comprising at least one of natural language inference, sentiment classification, and semantic textual similarity.

6. The method of claim 5, wherein the teacher model comprises a bidirectional encoder representations from transforms architecture.

7. A system for creating a student model from a teacher model for use in knowledge distillation, the system comprising:
at least one processor; and
at least one memory, wherein the at least one memory stores instructions that, when executed by the at least one processor, causes the at least one processor to:
provide the teacher model, wherein:
the teacher model comprises a neural network having a plurality of layers; and
the teacher model is trained on a first training dataset;
generate candidate student models, each of the candidate student models comprising a model having a unique permutation of layers derived from random selection of one or more layers of the plurality of layers of the teacher model for removal;
generate a second training dataset, the second training dataset comprising a randomly selected data from the first training dataset;
for each of the candidate student models:
provide the second training dataset as inputs to the candidate student model;
record outputs generated by the candidate student model from the second training data set; and
based on the recorded outputs, evaluate a performance of the candidate student model according to a predetermined model evaluation criterion;
determine which of the candidate student models performed best among the candidate student models based on the predetermined model evaluation criterion; and
identify a preferred candidate model as being the candidate student model that performed best.

8. The system of claim 7, wherein the predetermined model evaluation criterion comprises an output accuracy in which the output of the candidate student model is compared to an output of the teacher model.

9. The system of claim 7, wherein the predetermined model evaluation criterion comprises a Bayesian Information Criterion.

10. The system of claim 7, wherein the memory further stores instructions that, when executed by the processor, cause the processor to perform the step of:
training the preferred candidate student model so that an output of the preferred candidate student model over a transfer dataset mimics an output of the teacher model over the transfer dataset to within an acceptable loss of validity as defined by a predetermined loss function.

11. The system of claim 10, wherein the memory further stores instructions that, when executed by the processor, cause the processor to perform the step of:
employing the preferred candidate student model for a natural language processing task in a contact center, the natural language processing task comprising at least one of natural language inference, sentiment classification, and semantic textual similarity.

12. The system of claim 11, wherein the first model comprises a bidirectional encoder representations from transforms architecture.

13. At least one non-transitory computer-readable storage medium having computer instructions stored therein, which when executed by a computing system, causes the computing system to:
provide a teacher model, wherein:
the teacher model comprises a neural network having a plurality of layers; and
the teacher model is trained on a first training dataset;
generate candidate student models, each of the candidate student models comprising a model having a unique permutation of layers derived from random selection of one or more layers of the plurality of layers of the teacher model for removal;
generate a second training dataset, the second training dataset comprising a randomly selected data from the first training dataset;
for each of the candidate student models:
provide the second training dataset as inputs to the candidate student model;
record outputs generated by the candidate student model from the second training data set; and
based on the recorded outputs, evaluate a performance of the candidate student model according to a predetermined model evaluation criterion;
determine which of the candidate student models performed best among the candidate student models based on the predetermined model evaluation criterion; and identify a preferred candidate model as being the candidate student model that performed best.

14. The at least one non-transitory computer-readable storage medium of claim 13, wherein the predetermined model evaluation criterion comprises an output accuracy wherein the output of the candidate student model is compared to an output of the teacher model.

15. The at least one non-transitory computer-readable storage medium of claim 13, wherein the predetermined model evaluation criterion comprises a Bayesian Information Criterion.

16. The at least one non-transitory computer-readable storage medium of claim 13, wherein the computer instructions stored therein, when executed by the computing system, further causes the computing system computer to:

train the preferred candidate student model so that an output of the preferred candidate student model over a transfer dataset mimics an output of the teacher model over the transfer dataset to within an acceptable loss of validity as defined by a predetermined loss function.

17. The at least one non-transitory computer-readable storage medium of claim 16, wherein the computer instructions stored therein, when executed by the computing system, further causes the computing system to:

employ the preferred candidate student model for a natural language processing task in a contact center, the natural language processing task comprising at least one of natural language inference, sentiment classification, and semantic textual similarity.

18. The at least one non-transitory computer-readable storage medium of claim 17, wherein the first model comprises a bidirectional encoder representations from transforms architecture.

* * * * *